Sept. 24, 1929.    H. E. WANER    1,729,232
TRIMMING DEVICE
Filed Oct. 5, 1928
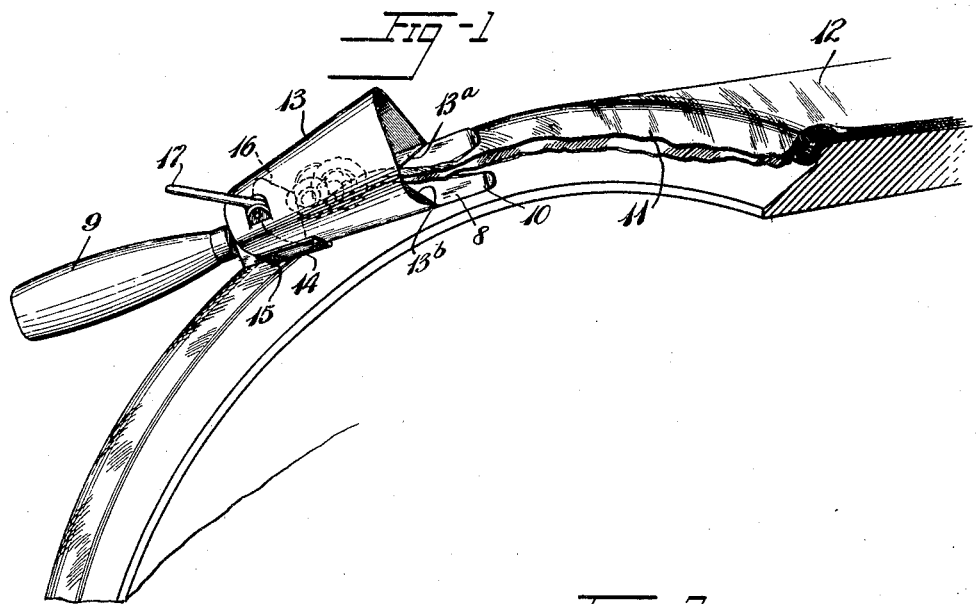
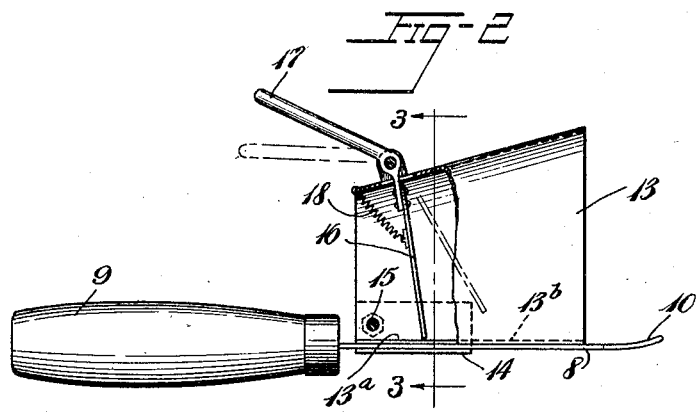
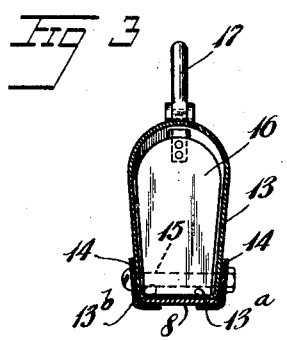
Inventor
Harry E. Waner
By Eskin & Avery
Attys Patented Sept. 24, 1929

1,729,232

UNITED STATES PATENT OFFICE

HARRY E. WANER, OF AKRON, OHIO, ASSIGNOR TO THE B. F. GOODRICH COMPANY, OF NEW YORK, N. Y., A CORPORATION OF NEW YORK

TRIMMING DEVICE

Application filed October 5, 1928. Serial No. 310,607.

This invention relates to fabric trimmers such as the knives employed in trimming the marginal portions of the fabric plies of a tire structure during the manufacture of a tire.

Among the chief objects of my invention are to provide for segregating the fabric trimmings from the margin of a tire structure or a ply thereof as the former is being cut from the said margin and to provide for preventing such waste material from contacting with any portion of the tire structure or from falling into the moving parts of a tire-building machine or onto the floor.

In the accompanying drawing:

Fig. 1 is a view in perspective of a side margin of a tire-building drum and a tire structure thereon and my trimming device in its preferred form in operative position in relation thereto.

Fig. 2 is a side view of the trimmer, parts being sectioned and broken away.

Fig. 3 is a vertical section on line 3—3 of Fig. 2.

Referring to the drawings, the trimming device comprises a V-knife 8 having its rear end secured in a handle 9, and having the opposite end turned slightly upward as shown at 10, the turned-up end being formed with a substantially V-shaped notch therein midway of its sides, the edges of the notched portion being adapted to function as cutting edges in the manner well known in the art.

For segregating and collecting the trimmings from the fabric margin 11 of a tire structure 12 as the margin is being trimmed, the knife blade 10 has a bent, sheet metal housing or hopper 13 mounted thereon and disposed with its forward end, which is open, resting upon the knife adjacent the notched cutting end thereof, and with its rear end closely adjacent the handle 9. The housing 13 is flared toward the notched end of the knife. The floor of the housing comprises inwardly bent flanges 13ª, 13ᵇ which are spaced from each other throughout their length and widely recede from each other adjacent the V-notch of the knife, to permit the knife to function normally. The housing is secured to the knife by means of a pair of angle members 14 secured to the respective sides of the housing 13 by a brazing or soldering and each having its lower, horizontally-disposed portion spaced vertically from the adjacent floor margin of the housing 13. A bolt 15 extends through the side walls of the housing 13 at the lower part of the rear end thereof and through the angle members 14, the arrangement being such that the housing may be clamped upon the knife 10, by means of the bolt, with the knife firmly embraced between the floor margins of the housing and the under-lying portions of the angle members 14.

The rear end of the housing 13 is normally closed by an end plate 16 secured to a lever 17 which extends through an aperture in the top of the housing 13 near the rear end thereof and is pivoted in a pair of ears bent up from the sheet metal of the housing, the lever having its free end extending rearwardly to a convenient point for actuation by the operator. The end plate 16 is shaped to generally correspond with the shape of the inner sides of the housing and is of sufficient length to contact with the floor margins of the housing before it reaches a position perpendicular with respect to the knife. A tension spring 18 connects the upper rear end of the housing 13 and the middle portion of the end plate 16, and is adapted to normally keep the rear end of the housing closed.

In using the device, the operator holds the knife in the usual manner with the curved forward end of the blade in trimming relation to the side margin of the tire structure being rotated on the tire-building drum, as shown in Fig. 1. The trimmings, in the form of an irregularly-shaped strip, pass into the hopper or housing 13 and are retained therein, so that they cannot again come into contact with any portion of the tacky tire fabric. Any small pieces detached from the fabric by the knife are likewise swept along upon the blade and into the hopper.

To remove the trimmings from the housing it is usually necessary only to hold the assembly with the mouth of the housing downward, the trimmings thereupon falling out. If the material sticks in the housing its removal is assisted by a quick blow or impact upon the lever 17 while the hopper is inverted over a suitable receptacle.

The invention is susceptible of modification within the scope of the appended claims.

I claim:

1. A trimming device comprising a rubber-trimming V-knife and a container mounted upon the knife in position for receiving the trimmings cut thereby.

2. An assembly as defined in claim 1 including means for dislodging trimmings from the container.

3. A trimming-container device comprising a V-knife and a container mounted thereon for collecting the trimmings cut thereby, the container comprising an open-ended housing having inwardly projecting floor flanges overlying only the side margins of the knife, and a closure for the rear end of the housing.

4. A container as defined in claim 3 including means coacting with each of the floor flanges for embracing the knife and a bolt connecting the two sides of the housing for clamping it upon the knife.

5. A trimming device comprising a hand-operated, chisel-handled knife and a hopper mounted thereon and adapted to collect the cuttings from the knife.

6. A trimming device comprising a hand-operated, chisel-handled knife and a housing mounted thereon and positioned so as to collect the cuttings from the knife, the housing being provided with a rear end plate movable to dislodge the trimmings from the housing.

7. A trimming device comprising a hand-operated, chisel-handled knife and a housing mounted thereon and adapted to collect the cuttings from the knife, and an ejector mounted on the hopper for ejecting material from the latter.

In witness whereof I have hereunto set my hand this 28th day of September, 1928.

HARRY E. WANER.